(12) United States Patent
Koncelik, Jr.

(10) Patent No.: US 9,020,167 B2
(45) Date of Patent: *Apr. 28, 2015

(54) SETTING TELEVISION OR RADIO DEFAULT CHANNEL

(71) Applicant: Lawrence J. Koncelik, Jr., East Hampton, NY (US)

(72) Inventor: Lawrence J. Koncelik, Jr., East Hampton, NY (US)

(*) Notice: Subject to any disclaimer, the term of this patent is extended or adjusted under 35 U.S.C. 154(b) by 282 days.

This patent is subject to a terminal disclaimer.

(21) Appl. No.: 13/712,406

(22) Filed: Dec. 12, 2012

(65) Prior Publication Data

US 2013/0101142 A1    Apr. 25, 2013

Related U.S. Application Data

(63) Continuation-in-part of application No. 11/949,475, filed on Dec. 3, 2007, now Pat. No. 8,356,315.

(51) Int. Cl.
| | |
|---|---|
| *H02B 1/00* | (2006.01) |
| *H04N 7/10* | (2006.01) |
| *H04N 7/025* | (2006.01) |
| *H04R 3/00* | (2006.01) |
| *H04N 5/50* | (2006.01) |
| *H04N 21/438* | (2011.01) |
| *H04N 5/63* | (2006.01) |
| *H04N 21/443* | (2011.01) |

(52) U.S. Cl.
CPC .. *H04R 3/00* (2013.01); *H04N 5/50* (2013.01); *H04N 5/63* (2013.01); *H04N 21/4383* (2013.01); *H04N 21/4436* (2013.01)

(58) Field of Classification Search
None
See application file for complete search history.

(56) References Cited

U.S. PATENT DOCUMENTS

| | | | |
|---|---|---|---|
| 3,961,267 A | 6/1976 | Weissmueller, Jr. | |
| 4,651,342 A | 3/1987 | Mengel | |
| 4,837,627 A | 6/1989 | Mengel | |
| 4,876,736 A | 10/1989 | Kiewit | |
| 5,430,493 A | 7/1995 | Kim | |
| 5,946,646 A | 8/1999 | Schena et al. | |
| 6,401,209 B1 | 6/2002 | Klein | |
| 6,486,900 B1 | 11/2002 | Shen et al. | |
| 6,721,958 B1 | 4/2004 | Dureau | |
| 7,565,122 B2 | 7/2009 | Eubanks | |
| 7,856,644 B2 | 12/2010 | Nicholson et al. | |
| 8,356,315 B2 * | 1/2013 | Koncelik, Jr. | 725/32 |

(Continued)

OTHER PUBLICATIONS

"Personal Viewing System (PVS): Operation and Maintenance Guide", Cardio Theater, 21 pages, Mar. 1, 2006.

(Continued)

*Primary Examiner* — Regina N Holder
(74) *Attorney, Agent, or Firm* — Brown & Michaels, PC (57) ABSTRACT

In some embodiments, a media device is configured so that it automatically causes a first predetermined channel to be displayed on an output device when a user sends a request signal to the media device to turn the output device off. The media device may be configured so that it causes the output device to shut off after the first predetermined channel has been on for a dwell period of time after the request signal has been received. The dwell period of time may be approximately two seconds. In some embodiments, a media device is configured so that it automatically causes a first predetermined channel to be displayed on an output device when a user sends a request signal to the media device to turn the output device on. In some embodiments, the media device is a television device. In other embodiments, the media device is a radio device.

20 Claims, 3 Drawing Sheets

(56) References Cited

U.S. PATENT DOCUMENTS

| | | | |
|---|---|---|---|
| 8,789,089 B2 * | 7/2014 | Koncelik, Jr. | ............... 725/32 |
| 2001/0013124 A1 | 8/2001 | Klosterman et al. | |
| 2002/0104082 A1 | 8/2002 | Fries | |
| 2005/0289614 A1 | 12/2005 | Baek et al. | |
| 2006/0020982 A1 | 1/2006 | Jerding et al. | |
| 2007/0288954 A1 | 12/2007 | Chung et al. | |
| 2012/0164836 A1 | 6/2012 | Chumakov | |

OTHER PUBLICATIONS

"How to Set the Power on Channel for Your Cable TV", available at http://web.archive.org/web/20070228154845/http://www.wftv.com/news/11083830/detail.html, 2 pages, posted Feb. 22, 2007, updated Feb. 24, 2007.

* cited by examiner

SETTING TELEVISION OR RADIO DEFAULT CHANNEL

REFERENCE TO RELATED APPLICATIONS

This is a continuation-in-part patent application of co-pending application Ser. No. 11/949,475, filed Dec. 3, 2007, entitled "SETTING TELEVISION DEFAULT CHANNEL". The aforementioned application is hereby incorporated herein by reference.

BACKGROUND OF THE INVENTION

1. Field of the Invention

The invention pertains to the fields of radio and television. More particularly, the invention pertains to methods and apparatus concerning the selection of television channels and radio channels.

2. Description of Related Art

There are various devices known in the art for setting television channels. U.S. Pat. No. 3,961,267, entitled "Channel Selecting Control System for Television Tuner Including Unused Channel Skip System" and issued Jun. 1, 1976 to Weissmueller, provides a programmable tuning scanner which steps through preselected channels to allow an operator to stop at a desired channel. U.S. Pat. No. 4,876,736, entitled "Method and Apparatus for Determining Channel Reception of a Receiver" and issued Oct. 24, 1989 to Kiewit, provides the initial tuning of a default channel when a television is turned on following the television being turned off. It is unclear how this initial default channel is set or what it is set to, although it appears that the television merely goes back to the channel it was set to when it was turned off.

U.S. Pat. App. Pub. No. 2001/0013124, entitled "Systems and Methods for Replacing Television Signals" by Klosterman et al. and published Aug. 9, 2001, discloses methods and systems to substitute alternative video, audio signals, graphics, or text to be displayed on the viewer's television display monitor for the video or audio signals that would otherwise be displayed according to the channel to which the viewer has tuned the television set. Methods and systems replace or modify the advertisements that can be seen and heard by the television viewer.

A device marketed under the trade name "Cardio Theater" (Amer Sports Corp., Helsinki, Finland) is used at exercise facilities or gymnasiums. This device flicks to a predetermined channel, so that the channel number shows, and then a TV monitor is shut off There is no dwell time and no image shown of the channel to which the television monitor is switched to.

U.S. Pat. No. 7,565,122, entitled "System and Method for Providing Automatic Tuning of a Radio Receiver and for Providing Automatic Control of a CD/Tape Player" and issued Jul. 21, 2009 to Eubanks, discloses a sound system with a radio receiver having the ability to automatically tune to a new radio station if the current radio station is broadcasting a song, program, or other content that the user dislikes or if one or more predetermined radio stations is broadcasting content that the listener likes. U.S. Pat. No. 7,565,122 does not disclose any automatic control when the radio receiver is turned on or off.

U.S. Pat. No. 7,856,644, entitled "System and Method of Selective Advertising on a TV Channel" and issued Dec. 21, 2010 to Nicholson et al., discloses a method and system for providing selective advertising on a television channel by downloading appropriate advertisements from an advertising server to a subscriber's set top box over an out-of-band channel. The set top box monitors for download triggers to provide advertisements to the subscriber's set top box and advertising triggers to insert advertisements when an advertising opportunity occurs. The advertisements can be downloaded in advance of any advertising triggers to a local storage means associated with the set top box, if available.

The above-mentioned patents are hereby incorporated by reference herein.

SUMMARY OF THE INVENTION

In some embodiments, a media device is configured so that it automatically causes a first predetermined channel to be displayed on an output device when a user sends a request signal to the media device to turn the output device off. The media device may be configured so that it causes the output device to shut off after the first predetermined channel has been on for a dwell period of time after the request signal has been received. The dwell period of time may be approximately two seconds. In some embodiments, a media device is configured so that it automatically causes a first predetermined channel to be displayed on an output device when a user sends a request signal to the media device to turn the output device on. In some embodiments, the media device is a television device. In other embodiments, the media device is a radio device.

DETAILED DESCRIPTION OF THE INVENTION

In some embodiments, a media device includes a media receiver and an output device. The media receiver may, for example, be a television receiver, a cable television tuner, a satellite television tuner, an Advanced Television Systems Committee (ATSC) tuner, a radio receiver, a satellite radio receiver, or a radio tuner. The media receiver may be configured so that it automatically causes a predetermined channel to be switched to and it automatically causes one or more images or one or more sounds currently being transmitted on the predetermined channel to be produced by the output device when an end user sends a request signal to the media receiver to turn the output device off. In some embodiments, the output device is a television monitor. In other embodiments, the output device is at least one radio speaker. The media receiver may be configured so that it causes the output device to shut off after the predetermined channel has been outputted on the output device for a dwell period of time after the request signal has been received. The dwell period of time may be approximately two seconds.

The media receiver may cause the predetermined channel to be switched to regardless of what channel was being outputted on the output device at the time that the request signal was received. The request signal may be received from a remote control.

In some embodiments, the media receiver may be configured so that it automatically causes a predetermined channel to be switched to and it automatically causes one or more images or one or more sounds currently being transmitted on the predetermined channel to be produced by the output device when an end user sends a request signal to the media receiver to turn the output device on. The media receiver may cause the predetermined channel to be switched to regardless of what channel was being outputted on the output device at the time that the output device was last turned off. The request signal may be received from a remote control.

In some embodiments, the media receiver may be configured so that it automatically causes predetermined channels to be switched to and it automatically causes one or more images or one or more sounds currently being transmitted on the predetermined channels to be produced by the output device when an end user sends a request signal to the media receiver to turn the output device on or off. The predetermined on channel and the predetermined off channel may be the same or different predetermined channels.

A default channel controller preferably controls what channel is selected as the predetermined channel or sets the predetermined channel. In some embodiments, the default channel controller is an end user of the media device. In other embodiments, the default channel controller is a manufacturer or seller of the media device. In yet other embodiments, the default channel controller is a media signal provider, which may include, but is not limited to, a television signal provider, a radio signal provider, a cable television signal provider, a satellite television signal provider, a television broadcasting company, a satellite radio signal provider, or a radio broadcasting signal provider. When the default channel controller is a media signal provider, the media signal provider may also be able to turn the media device or the output device on and off and control whether the media device or the output device is on or off exclusively, or an end user may also share the ability to turn the media device or the output device on and off with the media signal provider. The media receiver may be configured so that an end user of the output device is able to change the predetermined channel setting. Alternatively, the media receiver may be configured so that the predetermined channel setting is fixed by a manufacturer or seller so that an end user cannot change it. The television device may be configured so that the predetermined channel can be changed by a signal, including, but not limited to, a cable signal, a broadcast signal, and a satellite signal, but can not legally be changed by an end user. In some embodiments, the signal is sent by a default channel controller.

The media receiver may be configured so that it automatically causes a predetermined channel to be switched to, thereby automatically causing one or more images or one or more sounds currently being transmitted on the predetermined channel to be outputted on an output device, when an end user sends a request signal to the media receiver to turn the output device on. In some embodiments, the predetermined channel may be set by a signal, including, but not limited to, a cable signal, a wireless signal, a broadcast signal, and a satellite signal, but can not legally be changed by an end user.

A "channel", as used herein, is one physical or virtual channel over which a media program is distributed, where the media program proceeds regardless of whether a particular end user has tuned into the channel. The channel is one of a plurality of selectable channels, all channels typically simultaneously providing media programs. The transmitted media program may be live or pre-recorded. In some embodiments, the channel is a television channel. In other embodiments, the channel is a radio channel. Static images or sounds, such as, for example, screen savers or welcome menu screens or messages, or media programs that start upon the end user selecting the program or activating the device that displays or emits the media program, such as pre-recorded internet videos or prerecorded media players, are not considered "channels" within the spirit of the present invention.

In television embodiments, the media signal provider is a television signal provider, the media device is a television device, the output device is a television monitor, the media channel is a television channel, and the one or more transmissions being outputted are one or more images being displayed.

In radio embodiments, the media signal provider is a radio signal provider, the media device is a radio device, the output device is at least one radio speaker, the media channel is a radio station, and the one or more transmissions being outputted are one or more sounds being emitted.

In other embodiments, the media device is a communication device, including, but not limited to, security devices involving or including closed-circuit, live-screen monitoring of different events or catastrophes. In some embodiments, the communication device may be a closed circuit system, including, but not limited to, a closed circuit radio system or a closed circuit television monitoring system, such as the Airwave network, as used in England.

Figure 1:
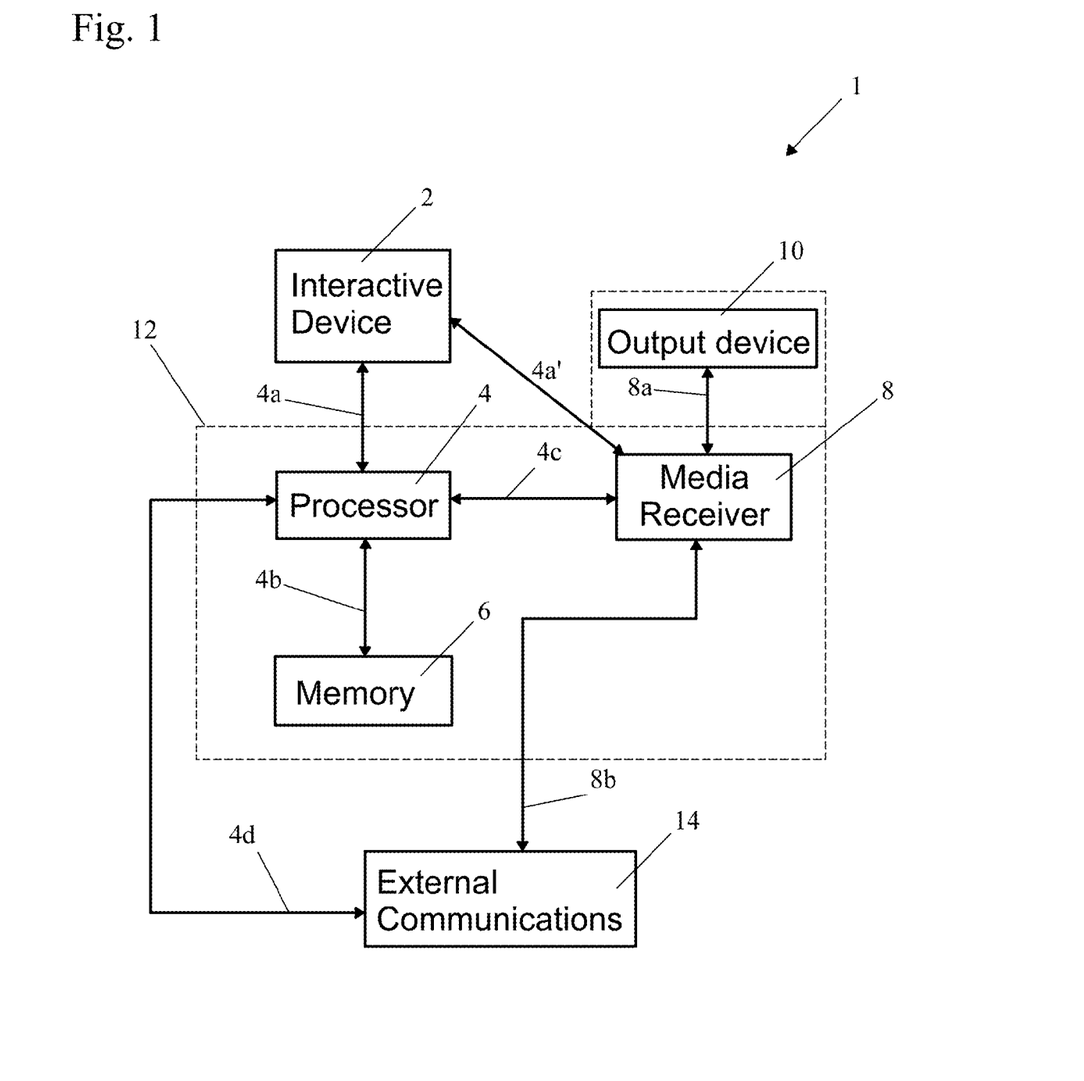
FIG. 1 shows a diagram of a default channel system in accordance with an embodiment of the present invention.

FIG. 1 shows a diagram of a default channel system 1. The system 1 includes an interactive device 2, a processor 4, a memory 6, a media receiver 8, and an output device 10. The processor 4, the memory 6, and the media receiver 8 form the media device 12. In some embodiments, the output device 10 is also part of the media device 12. The system 1 may be in communication with, or may include external communications 14. The interactive device 2, memory 6, and media receiver 8 are in communication with the processor 4 by communications lines 4a, 4b, and 4c, respectively, which may be hardwired, wireless, optical, or any other type of communications lines. The output device 10 is in communication with the media receiver 8 via communication line 8a, which may also be any type of communications line.

The interactive device 2 may include a computer keyboard, a computer mouse, a remote control, a touch screen (which may be the screen of the output device), or any other interactive device or devices. The interactive device 2 may communicate with the processor 4 or with the media receiver 8 via wireless communication 4a, 4a'. In some embodiments, the end user uses the interactive device 2 to set the predetermined channel or the dwell time. The processor 4 may be a microprocessor, or any type of computer or electronic processor. The media receiver 8 may be a television tuner, a cable television tuner, a satellite tuner, an ATSC tuner, and/or any other type of tuner used to select television channels and a tuner may also include any type of radio tuner used in the selection of radio stations, including, but not limited to, a radio receiver, a satellite radio receiver, or a radio tuner. The output device 10 may be a computer display, a television display or monitor, or at least one radio speaker.

The system 1 may communicate with external communications 14. External communications 14 may include or represent a cable television feed or line, an internet feed, or any other external communications. The external communications 14 may be connected to or in communication with the processor 4 via a communications line 4d, and/or may be connected to or in communication with the media receiver 8 via communications line 8b. The external communications 14 may include a signal or communications from a satellite television company such as DIRECTV® service (DIRECTV, LLC, El Segundo, Calif.). The satellite signal may communicate with the processor 4 or with the media receiver 8 by a remote communications link such as a satellite signal or a TV or radio frequency signal. The communications lines 4*d* and 8*b* may include or may be wireless communications, such as the airwaves.

Figure 2:
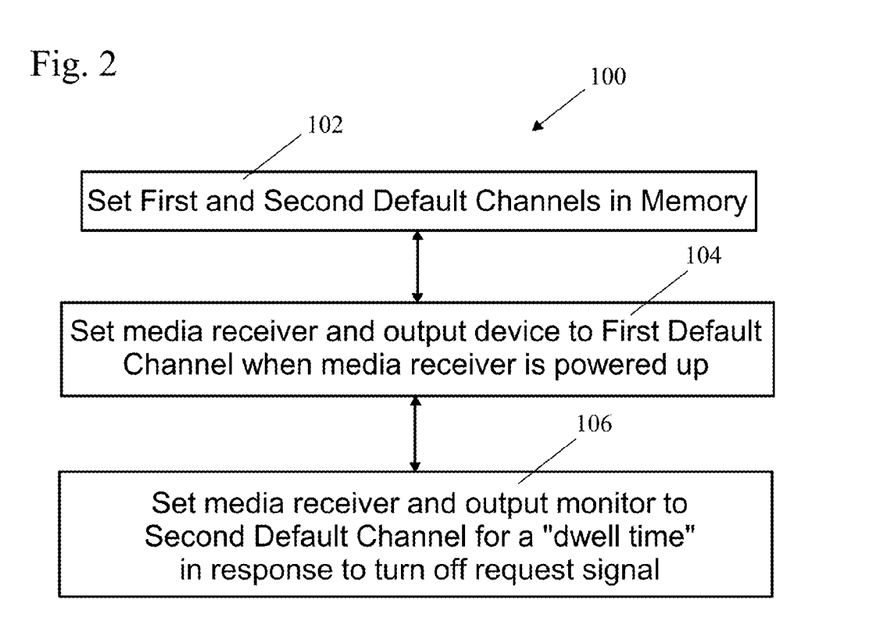
FIG. 2 shows a flow chart of a method for use with the system of FIG. 1.

FIG. 2 shows a flow chart 100 of a preferred method for use with the system 1 of FIG. 1. The method of FIG. 2 includes step 102 during which first and second default channels are set in memory 6. The first and second default channels (and dwell time) may be set permanently so that they cannot be changed by a purchaser of a system 1, or portions of a system 1. The first and second default channels (and dwell time) may be set in a manner which makes it difficult to change them, but not impossible to change. In an alternative embodiment, the first and second default channels (and dwell time) may be set, altered, or selectively programmed by a purchaser and/or user of the system 1. Alternatively, the first and second default channels (and dwell time) may be permanently or temporarily set by the manufacturer of the apparatus or a portion of the apparatus. Alternatively, the first and second default channels (and dwell time) may be exclusively set or reset permanently or temporarily by a radio or television network or a broadcasting, satellite, or cable company by sending a verified signal over a communications link, such as through an external communications or link 14 to the system 1, such as to the processor 4 or to the media receiver 8. For example, in a television embodiment, Cablevision® service (CSC Holdings, Inc., Woodbury, N.Y.) could distribute a system or portion of the system 1 to its consumers. Cablevision® service could then have the ability to control the default stations and dwell times of their consumers by sending signals via external communications or link 14 to the processor 4 or media receiver 8. For example, Cablevision® service could change the first and second default channels via the external communications link 14. When the TV is powered on, the signal may be sent so that Cablevision® service channel 100 may be set to come on. When a request for shut down or power off signal is received, the default channel "100" may be set to come on for a dwell time that is pre programmed into a computer memory, such as memory 6, by any one or more of the programmers and or methods described above.

The method of FIG. 2 further includes step 104 during which the media receiver 8 and the output device 10 are set to a first default channel when the media receiver is powered up. The first default channel setting is typically stored in memory 6. The processor 4 typically retrieves the first default channel setting from the memory 6 and causes the media receiver 8 and the output device 10 to be set to the first default channel, so that the images and/or sounds for the first default channel are output by the output device 10. In at least one embodiment, this setting of the first default channel occurs automatically upon power up of the media receiver 8 and output device 10 regardless of what channel the media receiver 8 and output device 10 were tuned to immediately before the media receiver 8 and output device 10 were last turned off.

The method of FIG. 2 further includes step 106 during which the media receiver 8 and the output device 10 are set to output a second default channel for a "dwell time" in response to a turn off output device signal. A user via the interactive device 2 may supply the turn off output device signal. The turn off output device signal may be processed by the media receiver 8 and/or processor 4. The processor 4 may also include a receiver for receiving wireless signals from the interactive device 2 or may be supplied with the signals from the media receiver 8.

In some embodiments, the first and second default channel may be the same channel. In other embodiments, the channels may be different.

When the media receiver 8 and/or processor 4 receives the turn off output device request signal, the media receiver 8 and/or the processor 4 may cause the channel to be changed to the second default channel and may also set a timer to the dwell time in the processor 4. After the dwell period of time has ended, which may be for example five seconds, the media receiver 8 and/or the processor 4 may cause the media receiver 8 and the output device 10 to shut off. Thus, in one embodiment, every time the media receiver 8 and/or output device 10 is turned off, the output device 10 outputs for a dwell time, such as five seconds, the media program on a second default channel. In another embodiment, the default off channel and the dwell time are programmed, not by the viewer, but by an operator pursuant to a verified signal from a remote location such as a signal from a television broadcasting company, a satellite television company, a cable television company, a radio broadcasting company, or a satellite radio company.

A signal to change the predetermined "on" channel, the predetermined "off" channel, or the predetermined dwell time is preferably a verified signal so that the default channel setting, the default channel, the dwell time setting, and the dwell time can only be changed by an authorized entity, such as the media signal provider. This prevents the predetermined channels or dwell time from being interrupted or changed by another media signal provider, such as after a predetermined channel or dwell time has been initiated.

In a preferred embodiment, the media device prevents an unauthorized third party from changing the predetermined channel settings and the predetermined dwell time settings. In some embodiments, this is achieved by the media device requiring an authorized signal in order to change the predetermined settings. In some embodiments, this is achieved by the media device verifying that the signal came from the default channel controller. In a preferred embodiment, the signal setting the predetermined channel or the dwell period of time is a verified authenticated signal transmitted by the signal provider, and any signal that is not the verified authenticated signal transmitted by the signal provider is prevented from affecting the media device. In some embodiments, the media device includes a firewall to filter signals and to block signals from unauthorized sources or signals lacking verification or authentication, thereby preventing such unauthorized signals from changing the channel, turning the output device on or off, changing the predetermined channel setting, or changing the dwell time setting.

In some embodiments, a system or method, such as that disclosed in U.S. Pat. No. 6,721,958, entitled "Optional Verification of Interactive Television Content" and issued Apr. 13, 2004 to Dureau, hereby incorporated by reference herein, for verification of interactive television content, is used to verify signals to the media device and prevent unauthorized signals from affecting operation of the media device. In some embodiments, the signal from the default channel controller includes one or more data verification units identifiable by the media device. In other embodiments, a private key from the default channel controller and recognized by the media player ensures that the signal is from the default channel controller.

Figure 3:
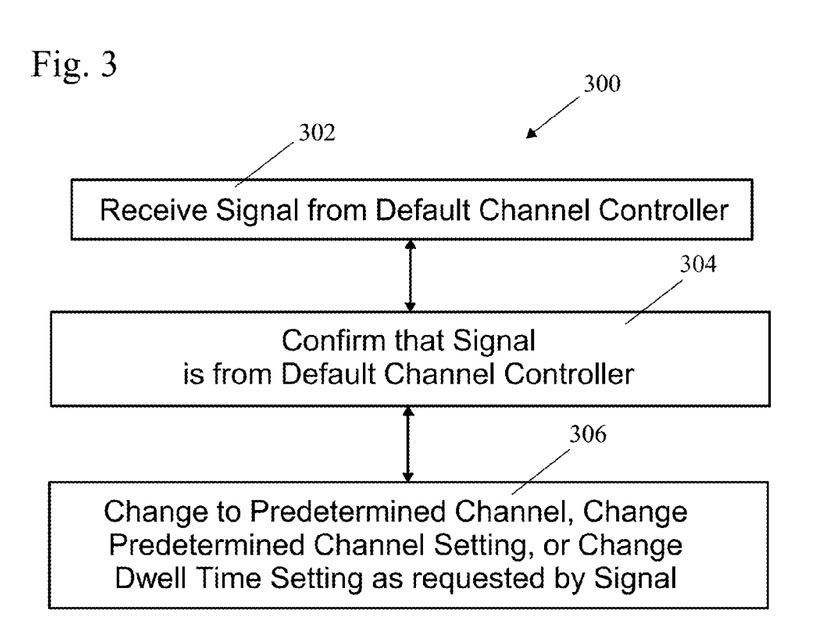
FIG. 3 shows a flow chart of another method for use with the system of FIG. 1.

FIG. 3 shows a method 300 of verifying that a received signal is a signal from a default channel controller to change to a predetermined channel, to change the predetermined channel setting, or to change the dwell time setting. The media device receives the signal from the default channel controller 302. The media device then confirms that the signal is from the default channel controller 304. The media device then implements the instructions in the signal, namely to change to a predetermined channel, change the predetermined channel setting, or change the dwell time setting 306.

Figure 4:
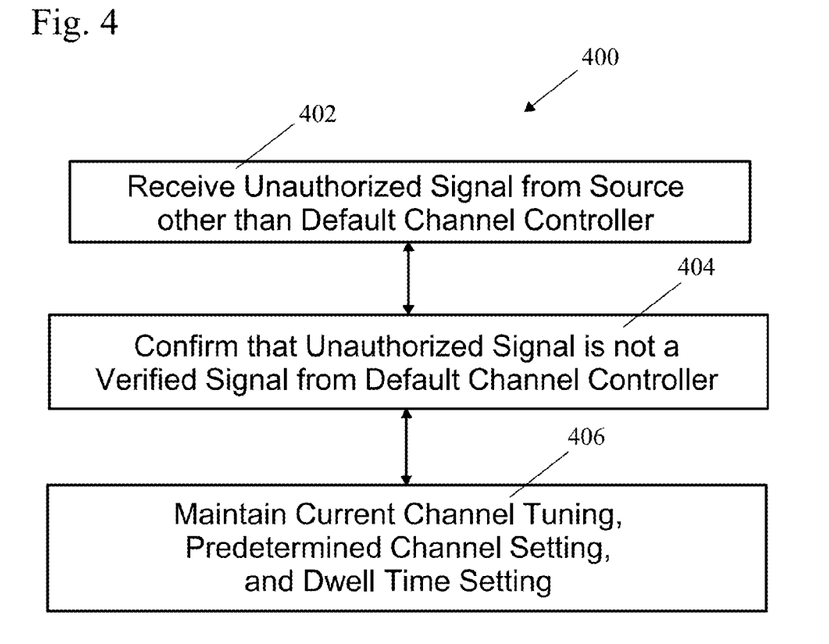
FIG. 4 shows a flow chart of another method for use with the system of FIG. 1.

FIG. 4 shows a method 400 of verifying that an unauthorized signal from a third party is not a verified signal from a default channel controller. The media device receives the unauthorized signal from a source other than a default channel controller 402. The media device then confirms that the unauthorized signal is not a verified signal from the default channel controller 404. The media device then maintains the current channel tuning, maintains the current predetermined channel setting, and maintains the current dwell time setting 406.

In some embodiments, the media device is blocked or prohibited from preventing the predetermined channel from being outputted on the output device, such that the media device is prevented from disrupting the predetermined channel setting, the predetermined dwell time setting, the predetermined channel being shown, or turning off the output device prior to the dwell period of time ending.

In a preferred embodiment, the media device prevents an unauthorized third party from changing the default channel and dwell time setting as well as from changing the default channel and dwell time after they have been set. In this regard, the media device can prevent an unauthorized third party from changing the channel on the output device from the predetermined channel to a different channel selected by the unauthorized third party or from turning off the output device at a time different from the dwell period of time. This insures that after the media device receives a request to turn the output device on, the output device outputs the predetermined channel selected by the default channel controller from the time the output device is turned on until the time the end user changes the channel. This also insures that after the media device receives a request to turn the output device off, the output device outputs the predetermined channel selected by the default channel controller from the time the turn off request is made until the end of the dwell period of time, at which time the output device turns off. In some embodiments, this is achieved by the media device requiring an authorized request signal in order to change the media channel or turn the output device off. In some embodiments, this is achieved by the media device verifying that the request signal came from either the default channel controller or an interactive device specific to the media device, such as a remote control.

While in some embodiments, one entity is exclusively the default channel controller, in other embodiments, more than one entity is able to set or change the predetermined channel or dwell time or to turn the media device or the output device on or off. In some embodiments, the media signal provider and the end user are both able to set or change the predetermined channel or dwell time. In some such embodiments, the end user is able to override the control of the media signal provider with any and all of these features. At one extreme, the media signal provider may have exclusive on/off, default channel setting, and dwell time control. At the other extreme, the media signal provider may have non-exclusive on/off, default channel setting, and dwell time control, preferably shared with the end user. In alternative embodiments, the media signal provider has exclusive control of one or more of the following features and non-exclusive control shared with the end user for one or more of the features: turning the media device on, turning the media device off, turning the output device on, turning the output device off, setting or changing the predetermined channel associated with a request to turn the output device on, setting or changing the predetermined channel associated with a request to turn the output device off, and setting or changing the dwell period of time.

In some embodiments, the default channel controller is able to acquire an end user media device profile based on prior user channel selections on the media device. The default channel controller may select, set, or change the predetermined channel based on the end user media device profile. The prior user channel selections on the media device may be acquired by any method known in the art. The end user media device profile preferably includes all interim channels selected by the user between any predetermined channels the media signal provider causes the output device to switch to when the output device is turned on or off. The end user media device profile also preferably includes the amount of time spent on each of these interim channels.

In accordance with one or more television embodiments of the present invention Cablevision® service or another TV signal provider such as DIRECTV® service may sell a remote control tuner or receiver for the media receiver 8 shown in FIG. 1 that would have a first default channel of the Cablevision® service channel as its "home channel". The channel might be, for instance, channel "100". In such an embodiment, whenever a viewer turns on his TV receiver, such as media receiver 8 and TV monitor 10, they would display the images and sounds of the first default channel, which would typically be stored in memory, such as memory 6, or memory of the media receiver 8, which in this embodiment would be Cablevision® service's channel 100. The viewer would then have to navigate to other channels from there to go to any other channel.

In another television embodiment, when a viewer presses a button or otherwise requests that the receiver 8 (which may be a cable tuner) be turned off, the receiver 8 first defaults to the second default channel, which may also be selected by, for example, Cablevision® service. In at least one embodiment, when a switch is activated that ultimately results in the receiver 8 being switched off, the receiver 8 and the monitor 10 do not immediately switch off, but rather default to, for example, channel "100" and dwell there for a brief time, for example five seconds, before the receiver 8 and TV monitor 10 shut down.

In this embodiment Cablevision® service, for example, profits from an increased viewing audience during the time that the television set remains on either the first default channel or the second default channel.

In alternative television embodiments, viewers, including people with disabilities, benefit by having a first and second default channel so that they always know what channel the television turns on to, and what channel it dwells on before it shuts down.

While some embodiments refer to television, in other embodiments, the techniques described may also be applied to radio receivers and the setting of channels relating to radio.

In some embodiments, signals may be sent bi-directionally from the media device and the media signal provider ("upstream") and from the media signal provider to the media device ("downstream"). In some such embodiments, when a request is made by the user to turn the media device on or off, the media device sends a signal upstream to the media signal provider and the media signal provider sends a signal back to the media device. The signal sent back from the media signal provider may include one or more of the following pieces of information: whether to output a predetermined channel, which predetermined channel to output, and the length of time of the dwell time. In such embodiments, it is not necessary for any of that information to be stored in memory on the media device, and the information from the media signal provider may be chosen at the time of sending the signal based on what is currently being outputted on any particular channel.

In some embodiments, the bi-directional signaling is accomplished using a hybrid-fiber coaxial (HFC) network. By using frequency division multiplexing, the HFC network may carry a variety of services, including analog television, digital television, video on-demand, telephony, and high-speed data. Services on these systems are carried on radio frequency (RF) signals in the 5 MHz to 1000 MHz frequency band. Signals are carried in both directions on the same network from the headend to the media device, and from the media device to the headend. The forward-path or downstream signals carry information from the headend to the media device, such as video content, voice, and internet data. The return-path or upstream signals carry information from the media device to the headend, such as control signals to order a movie or internet data to send an email. The forward-path and the return-path are actually carried over the same coaxial cable in both directions between the optical node and the media device. In order to prevent interference of signals, the frequency band is divided into two sections. In some embodiments, the sections are 52 MHz to 1000 MHz for forward-path signals and 5 MHz to 42 MHz for return-path signals.

In some embodiments, the bi-directional signaling is accomplished using a bi-directional satellite network including, but not limited to, those used for multicasting such as in very small aperture terminal (VSAT) satellite systems.

In some embodiments, the bi-directional signaling is accomplished using a uni-directional satellite network that operates with TCP/IP protocols and multicasting, a separate back channel. In such embodiments, the satellite service provider's uni-directional satellite is used together with a terrestrial back channel to the central uplink site. This land-based back channel can take many forms, including, but not limited to, the internet, frame relay, an integrated services digital network (ISDN), or a modem.

Figure 5:
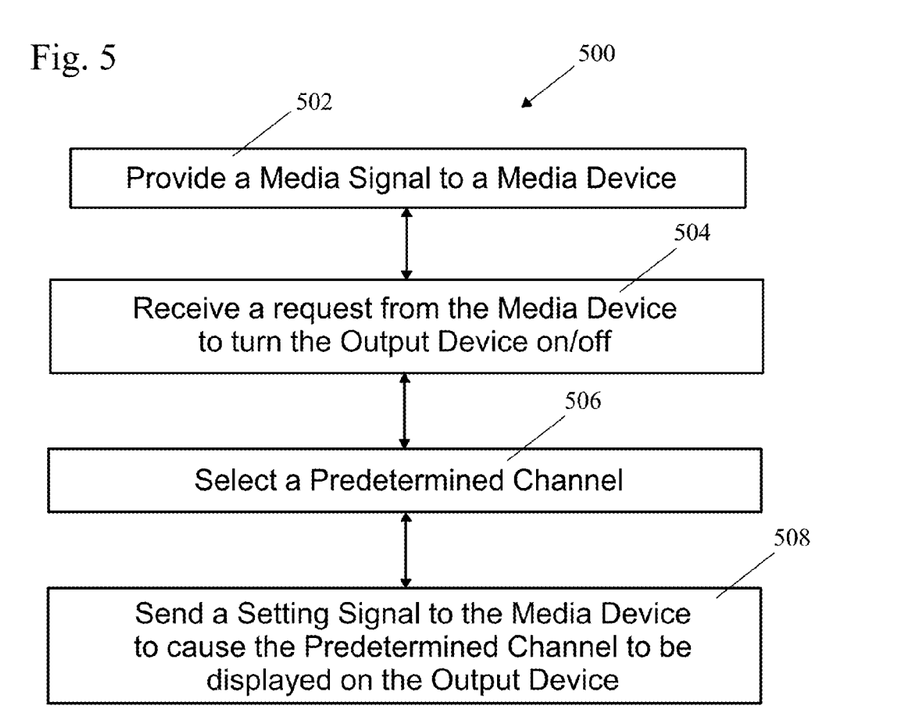
FIG. 5 shows a flow chart of another method for use with the system of FIG. 1.

FIG. 5 shows a method 500 of setting a predetermined channel on a media device. The default media channel controller optionally provides a media signal to the media device 502. The default media channel controller receives a request from the media device to turn the output device on or off 504. The default media channel controller selects a predetermined channel 506. The default media channel controller sends a setting signal to the media device to cause the predetermined channel to be displayed on the output device 508. In some such embodiments, the default channel controller selects the predetermined channel based on the media program currently being outputted by the predetermined channel. In some such embodiments, the default channel controller selects the predetermined channel based on the media program currently being outputted by the predetermined channel and an end user media device profile generated from data previously collected from the media device.

In a preferred embodiment, the interactive device simultaneously controls what channel the media device is tuned to and whether the output device is on or off. In such embodiments, a request from the interactive device to turn the television on or off preferably goes through the media device. In some such embodiments, the output device is part of the media device.

In many current media systems, the output device is a separate device from the media device and the output device may, in fact, be coupled to multiple media devices. In such systems, the output device and each media device typically require different interactive devices, and the output device only outputs the channel set by the media device when the output device is set to the input associated with the media device. In such systems, the output device and the media device are turned on and off independently of each other.

In embodiment with such media systems, the output device and the media device are preferably in communication with each other and configured to interact in the following ways. When a user makes a request to turn off the output device through the interactive device of the output device, the output device switches to the input associated with the media device (if not already on that input) and communicates with the media device to cause the media device to switch to the predetermined channel based on the predetermined channel setting (if not already on the predetermined channel) and the media device causes the output device to remain on until the predetermined dwell time has passed, at which time the media device causes the output device to turn off. When a user makes a request to turn on the output device through the interactive device of the output device, the output device switches to the input associated with the media device (if not already on that input) and communicates with the media device to cause the media device to turn on (if not already on) and to switch to the predetermined channel based on the predetermined channel setting (if not already on the predetermined channel). When a user makes a request to turn off the media device through the interactive device of the media device, the media device switches to the predetermined channel based on the predetermined channel setting and the media device communicates with the output device to cause the output device (if not already off) to turn off once the predetermined dwell time has passed. When a user makes a request to turn on the media device through the interactive device of the media device, the media device switches to the predetermined channel based on the predetermined channel setting and communicates with the output device to cause the output device to switch to the input associated with the media device (if not already on that input) and to turn on (if not already on).

In other embodiments with such media systems, a request to turn the media device on causes the media device to turn on to the predetermined channel based on the predetermined channel setting, and a request to turn the media device off causes the media device to switch to the predetermined channel based on the predetermined channel setting and turn off after the predetermined dwell period of time has passed, but these events have no effect on whether the output device is actually on or off or set to the input associated with the media device.

In some embodiments, the media device is a radio device, including a radio wave receiver that converts radio waves into audio sound. The radio device may also include a receiver and a transmitter, a transceiver, a receiver and a transponder, or a receiver and a repeater. The radio device may be capable of receiving radio signals from a radio signal provider or radio signal intermediary, such as a local area network or by any radio transmission mechanism known in the art including, but not limited to, direct communication links and wireless communication links. The radio device may be capable of sending, transmitting, or responding by any mechanism known in the art of radio communication to the signal provider. The radio signal may be amplitude modulation (AM) or frequency modulation (FM) radio signals.

Radio audio broadcasting may be transmitted by local radio stations, local area networks, cable radio, local wire television networks, satellite radio services, including, but not limited to, XM, Sirius, and Worldspace, and internet radio via streaming media on the internet. The signal types may be either analog audio or digital audio in different geographic areas.

The radio device may include a computer memory that stores radio stations that are predetermined by the user or the signal provider.

In some embodiments, the media device or the output device is installed in a vehicle. The media device or output device may be installed in the vehicle by the manufacturer at the time of manufacture of the vehicle or may be installed in the vehicle at a later time by the end user, the manufacturer, or a third party. In a preferred embodiment, the media device is a satellite radio device installed in an automobile.

In some embodiments, the media device or the output device is portable. In some embodiments, the portable media device is a smartphone or an electronic tablet. In some embodiments, the portable output device is a smartphone screen or an electronic tablet screen. In some embodiments, the portable media device is enabled to receive television channels. Although the television signal is preferably received wirelessly, such as by a satellite signal, a television broadcast signal, a wireless broadband network signal, or a mobile phone mobile communication signal, the television signal may alternatively be received over a wire, such as a cable signal. In other embodiments, the portable media device is enabled to receive radio channels. Although the radio signal is preferably received wirelessly, such as by a satellite radio signal, a radio broadcast signal, a wireless broadband network signal, or a mobile phone mobile communication signal, the radio signal may alternatively be received over a wire.

In some embodiments, the media signal is played on the portable output device using an application or "app" program run on the portable media device. In such embodiments, the user activating or starting the app serves as the request to turn the output device on, and the user closing or stopping the app serves as the request to turn the output device off, even though the output device may be "on" both before and after each of these events. In both cases, the request may trigger a predetermined channel to be shown, as in the previous embodiments, and, in the case of the request to turn off, for a predetermined dwell time.

In some embodiments, one signal provider is able to relinquish the exclusive setting of the predetermined channels and dwell time on the media device upon the switching from the signal provider to another signal provider, such as a result of a change in service. For example, the predetermined channels for a television are initially controlled and set by a cable television signal provider, and at a later time, the user changes services to satellite television, and the exclusivity of the predetermined channel that had previously been set in the media device by the cable television signal provider is lost and the predetermined channel can be changed by the satellite television signal provider.

In some embodiments, the method includes a media signal provider providing a media signal to a media device including an output device. The method also includes the media signal provider selecting a first predetermined media channel. The method further includes the media signal provider sending a first signal to the media device such that after the first signal is received by the media device, the media device automatically causes the output device to output the first predetermined media channel when the media device receives a first request to turn the output device off and one or more transmissions currently being outputted on the first predetermined media channel are outputted on the output device in response to receiving the first request at the media device. The method also includes the media signal provider selecting a second predetermined media channel. The method further includes the media signal provider sending a second signal to the media device such that after the second signal is received by the media device, the media device automatically causes the output device to output the second predetermined media channel when the media device receives a second request to turn the output device off and one or more transmissions currently being outputted on the second predetermined media channel are outputted on the output device in response to receiving the second request at the media device.

In other embodiments, the method includes a media signal provider providing a media signal to a media device including an output device. The method also includes the media signal provider selecting a first predetermined media channel. The method further includes the media signal provider sending a first signal to the media device such that after the first signal is received by the media device, the media device automatically causes the output device to output the first predetermined media channel when the media device receives a first request to turn the output device on and one or more transmissions currently being outputted on the first predetermined media channel are outputted on the output device in response to receiving the first request at the media device. The method also includes the media signal provider selecting a second predetermined media channel. The method further includes the media signal provider sending a second signal to the media device such that after the second signal is received by the media device, the media device automatically causes the output device to output the second predetermined media channel when the media device receives a second request to turn the output device on and one or more transmissions currently being outputted on the second predetermined media channel are outputted on the output device in response to receiving the second request at the media device.

In yet other embodiments, the method includes a media signal provider providing a media signal to a media device including an output device. The method also includes the media signal provider selecting a first predetermined media channel. The method further includes the media signal provider sending a first signal to the media device such that after the first signal is received by the media device, the media device automatically causes the output device to output the first predetermined media channel when the media device receives a first request to turn the output device off and one or more transmissions currently being outputted on the first predetermined media channel are outputted on the output device in response to receiving the first request at the media device. The method also includes the media signal provider selecting a second predetermined media channel. The method further includes the media signal provider sending a second signal to the media device such that after the second signal is received by the media device, the media device automatically causes the output device to output the second predetermined media channel when the media device receives a second request to turn the output device on and one or more transmissions currently being outputted on the second predetermined media channel are outputted on the output device when the output device turns on in response to receiving the second request at the media device.

In other embodiments, the method includes a media signal provider providing a media signal to a media device comprising an output device. The method also includes the media signal provider selecting a first predetermined dwell period of time. The method further includes the media signal provider sending a first signal to the media device such that after the first signal is received by the media device, the media device automatically causes the output device to output a media channel when the media device receives a first request to turn the output device off, and in response to receiving the first request at the media device, one or more transmissions currently being outputted on the media channel are outputted on the output device for the first predetermined dwell period of time before the output device turns off.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method comprising:
a radio device receiving a first request to turn the radio device off;
the radio device automatically switching to a first predetermined radio channel in response to receiving the first request; and
the radio device automatically causing at least one radio speaker of the radio device to output the first predetermined radio channel when the radio device receives the first request to turn the radio device off such that one or more sounds currently being emitted on the first predetermined radio channel are emitted on the radio speaker, in response to the radio device receiving the first request, for a predetermined dwell period of time after the first request is received by the radio device prior to the radio speaker turning off.

2. The method of claim 1 further comprising the radio device receiving a first signal from a default channel controller to set the first predetermined channel.

3. The method of claim 1 further comprising the radio device receiving a first signal from a default channel controller to set the predetermined dwell period of time.

4. A method comprising:
a radio device receiving a first request to turn the radio device on;
the radio device automatically switching to a first predetermined radio channel in response to receiving the first request; and
the radio device automatically causing at least one radio speaker of the radio device to output the first predetermined radio channel when the radio device receives the first request to turn the radio device on such that one or more sounds currently being emitted on the first predetermined radio channel are emitted on the radio speaker in response to the radio device receiving the first request.

5. The method of claim 4 further comprising the radio device receiving a first signal from a default channel controller to set the first predetermined channel.

6. A method comprising:
a media signal provider providing a media signal to a media device comprising an output device;
the media signal provider receiving a request signal from the media device to turn the output device off;
the media signal provider selecting a first predetermined channel; and
the media signal provider sending a setting signal to the media device to switch to the first predetermined channel such that one or more outputs currently being outputted on the first predetermined channel are outputted on the output device in response to receiving the request signal from the media device.

7. The method of claim 6, wherein the first predetermined channel is outputted on the output device for a predetermined dwell period of time after the request signal is received by the media signal provider prior to the output device turning off.

8. The method of claim 7 further comprising:
the media signal provider selecting the predetermined dwell period of time; and
the media signal provider sending a dwell signal to the media device to cause the output device to turn off after the predetermined dwell period of time after the request signal is received has passed.

9. The method of claim 6, wherein the setting signal is a verified authenticated signal transmitted by the signal provider, and any signal that is not the verified authenticated signal transmitted by the signal provider is prevented from affecting the media device.

10. The method of claim 6, wherein an end user can not change the first predetermined media channel.

11. The method of claim 6, wherein the media signal provider selects the first predetermined channel based on what is currently being transmitted on the first predetermined channel.

12. A method comprising:
a media signal provider providing a media signal to a media device comprising an output device;
the media signal provider receiving a request signal from the media device to turn the output device on;
the media signal provider selecting a first predetermined channel; and
the media signal provider sending a setting signal to the media device to switch to the first predetermined channel such that one or more outputs currently being outputted on the first predetermined channel are outputted on the output device in response to receiving the request signal from the media device.

13. The method of claim 12, wherein the setting signal is a verified authenticated signal transmitted by the signal provider, and any signal that is not the verified authenticated signal transmitted by the signal provider is prevented from affecting the media device.

14. The method of claim 12, wherein an end user can not change the first predetermined media channel.

15. The method of claim 12, wherein the media signal provider selects the first predetermined channel based on what is currently being transmitted on the first predetermined channel.

16. A method comprising:
a portable media device receiving a first request to turn the portable media device off;
the portable media device automatically switching to a first predetermined channel in response to receiving the first request; and
the portable media device automatically causing an output device of the portable media device to output the first predetermined channel when the portable media device receives the first request such that one or more outputs currently being outputted on the first predetermined channel are outputted on the output device, in response to the portable media device receiving the first request, for a predetermined dwell period of time after the first request is received by the portable media device prior to the output device turning off.

17. The method of claim 16 further comprising the portable media device receiving a first signal from a default channel controller to set the first predetermined channel.

18. The method of claim 16 further comprising the portable media device receiving a first signal from a default channel controller to set the predetermined dwell period of time.

19. A method comprising:
a portable media device receiving a first request to turn the portable media device on;
the portable media device automatically switching to a first predetermined channel in response to receiving the first request; and
the portable media device automatically causing an output device of the portable media device to output the first predetermined channel when the portable media device receives the first request such that one or more outputs currently being outputted on the first predetermined channel are outputted on the output device in response to the portable media device receiving the first request.

20. The method of claim 19 further comprising the portable media device receiving a first signal from a default channel controller to set the first predetermined channel.

\* \* \* \* \*